(12) United States Patent
Yamane et al.

(10) Patent No.: US 7,519,787 B2
(45) Date of Patent: Apr. 14, 2009

(54) METHOD AND A COMPUTER FOR STORAGE AREA MANAGEMENT

(75) Inventors: Kazuki Yamane, Yokohama (JP); Takeshi Arisaka, Kawasaki (JP); Hiroyuki Tanaka, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 266 days.

(21) Appl. No.: 11/488,720

(22) Filed: Jul. 19, 2006

(65) Prior Publication Data
US 2007/0277017 A1 Nov. 29, 2007

(30) Foreign Application Priority Data
May 23, 2006 (JP) .............................. 2006-142754

(51) Int. Cl.
*G06F 12/00* (2006.01)
(52) U.S. Cl. ............... 711/165; 711/112; 711/E12.002; 711/170; 707/205
(58) Field of Classification Search ................ 711/112, 711/165, E12.002, 170; 707/205
See application file for complete search history.

(56) References Cited

U.S. PATENT DOCUMENTS

2007/0239954 A1* 10/2007 Sakashita et al. ............ 711/165

2008/0091748 A1* 4/2008 Beniyama et al. ........... 707/205

FOREIGN PATENT DOCUMENTS

JP 2005-092308 9/2003

* cited by examiner

*Primary Examiner*—Hyung S Sough
*Assistant Examiner*—Mehdi Namazi
(74) *Attorney, Agent, or Firm*—Reed Smith LLP; Juan Carlos A. Marquez, Esq.

(57) ABSTRACT

A method for storage management is provided which displays the materials on which it is determined which of the thin provisioning volume or the logical unit (LU) is to be used for storage promotion. The method is executed in a computer system having one or more host computers, one or more storage subsystems, and a management computer. The storage subsystem includes a physical disk and a disk controller. The disk controller provides the host computer with the thin provisioning volume. The management computer obtains the allocated capacity from the disk controller and the host-recognized capacity from the host computer. By subtracting the obtained allocated capacity from the host-recognized capacity, the management computer calculates an improved capacity. By dividing the calculated improved capacity by the obtained host-recognized capacity, the management computer calculates an improvement ratio and displays the calculated improvement ratio.

14 Claims, 12 Drawing Sheets

FIG. 3

TABLE OF LIST OF HOSTS USING VOLUMES TO BE MONITORED  531

| TP Vol ID FOR STORAGE (5311) | HOST ID (5312) | TP Vol ID FOR HOST (5313) | MONITORING INTERVAL (5314) | MONITORING LIMIT (5315) |
|---|---|---|---|---|
| 01:00 | www | /dev/hda1 | 1day | 2007/10/13 23:59:59 |
| 01:01 | www | /dev/hda2 | 1day | 2007/10/13 23:59:59 |
| 01:02 | mail | /dev/rdsk/c17t0d5 | 2days | 2008/3/15 23:59:59 |
| 01:03 | mail | /dev/rdsk/c17t0d6 | 2days | 2008/3/15 23:59:59 |
| ⋮ | ⋮ | ⋮ | ⋮ | ⋮ |

FIG. 4

VOLUME CAPACITY RECORDING TABLE  532

| TP Vol ID FOR STORAGE (5321) | DISK-ALLOCATED CAPACITY (5322) | HOST-USING CAPACITY (5323) | MAXIMUM CAPACITY (5324) | MONITORING TIME (5325) |
|---|---|---|---|---|
| 01:00 | 0GB | 0GB | 200GB | 2006/1/13 07:30'00 |
| ⋮ | ⋮ | ⋮ | ⋮ | ⋮ |
| 01:00 | 100GB | 90GB | 200GB | 2006/2/14 07:30'00 |
| ⋮ | ⋮ | ⋮ | ⋮ | ⋮ |
| 01:00 | 120GB | 100GB | 200GB | 2006/3/15 07:30'00 |
| ⋮ | ⋮ | ⋮ | ⋮ | ⋮ |
| 01:01 | 280GB | 120MB | 1TB | 2005/10/14 18:40'49 |
| ⋮ | ⋮ | ⋮ | ⋮ | ⋮ |

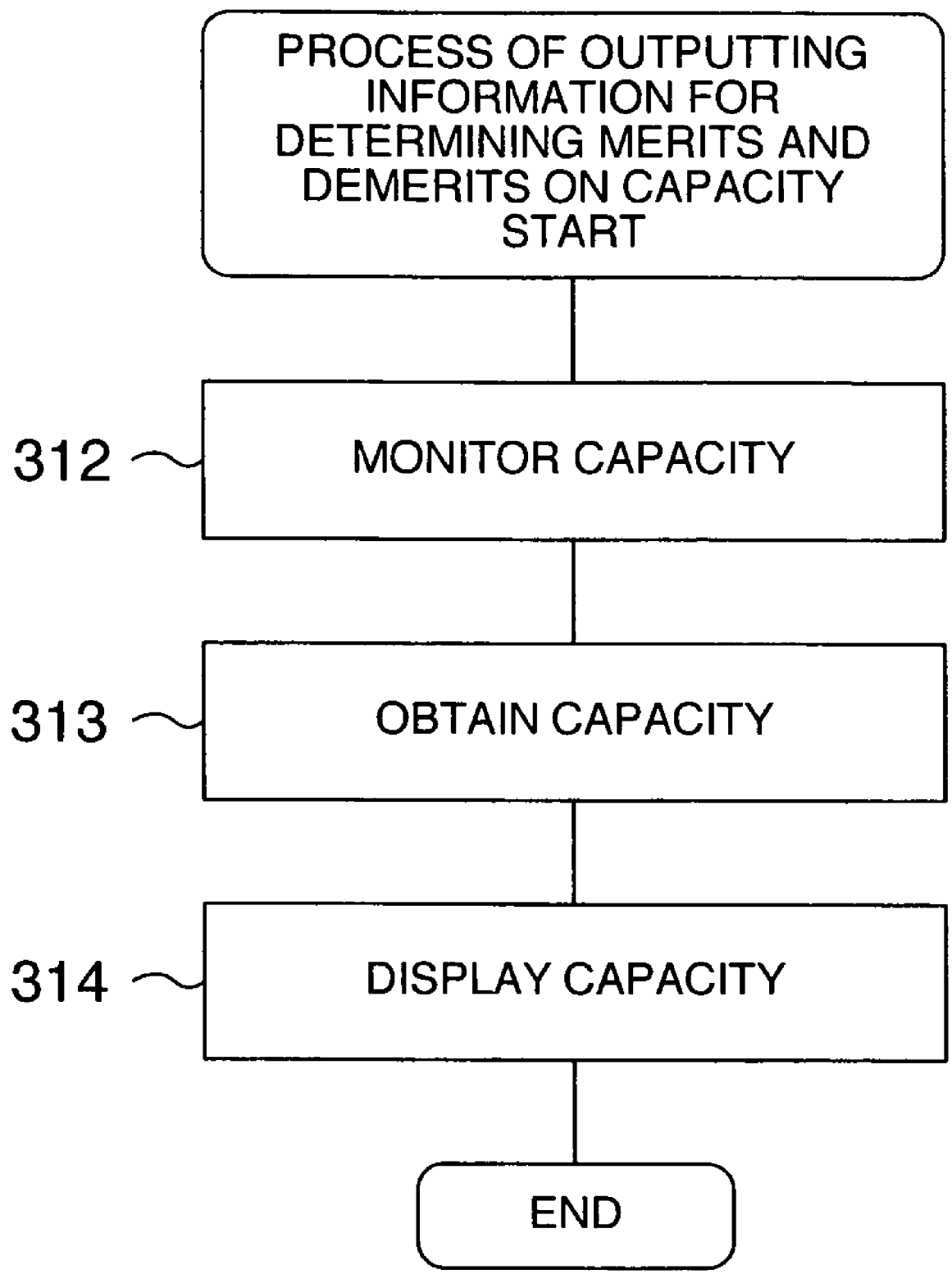

FIG.15

- USING STATUS OF VOLUME 01:00

| MONITORING TIME | 2006/3/15 07:30'00 | |
|---|---|---|
| MAXIMUM CAPACITY | 200GB | |
| DISK-ALLOCATED CAPACITY | 120GB | |
| HOST-USING CAPACITY | 100GB | |
| IMPROVEMENT EFFECT CAUSED BY INTRODUCTION OF THIN PROVISIONING | IMPROVEMENT RATIO | 40% |
| | IMPROVED CAPACITY | 80GB |
| EXCESS ALLOCATION INFORMATION | EXCESS ALLOCATION RATIO | 20% |
| | EXCESS ALLOCATION CAPACITY | 20GB |

ATTENTION! EXCESS ALLOCATION RATIO EXCEEDS 45%

FIG.16

- FREQUENCY OF SEQUENTIAL ACCESS OF VOLUME

| CORRELATION COEFFICIENT OF SEQUENTIAL ACCESS | 0.61 |
|---|---|

- RESPONSE TIME OF VOLUME

| RESPONSE TIME | 0.32ms |
|---|---|

ATTENTION! RESPONSE TIME EXCEEDS 0.30ms

METHOD AND A COMPUTER FOR STORAGE AREA MANAGEMENT

INCORPORATION BY REFERENCE

The present application claims priority from Japanese application JP2006-142754 filed on May 23, 2006, the content of which is hereby incorporated by reference into this application.

BACKGROUND OF THE INVENTION

The present invention relates to a method for storage area management included in a computer system having a storage subsystem that provides a thin provisioning volume. In particular, the invention relates to a technology of displaying information about the thin provisioning volume.

The storage subsystem provides a host computer with a logical unit (LU) by statically allocating a storage area of a physical disk. However, LU has the following disadvantages.

As one disadvantage, for example, the storage capacity of a physical disk allocated to the host computer is made larger than the storage capacity actually used by the host computer. This is because the storage capacity to be used by the application run on the host computer cannot be precisely grasped. As another disadvantage, the promotion cost taken in changing the capacity of the LU is high.

The thin provisioning technique has been known as a technology of overcoming these disadvantages. The storage subsystem provides the host computer with the volume (thin provisioning volume) realized by the thin provisioning technique.

This technology allows the storage subsystem to provide the host computer with the thin provisioning volume recognized as a volume having a larger storage capacity than the actually allocated storage capacity of a physical disk. In receipt of the request for write to the thin provisioning volume from the host computer, the storage subsystem dynamically allocates the storage area of the physical disk to the concerned thin provisioning volume to which data is requested to be written.

In some cases, however, the storage area of the physical disk may be wastefully allocated to the thin provisioning volume. For example, an application run on the host computer is executed to delete a file written on the thin provisioning volume. In this case, a difference takes place between the storage capacity of the physical disk allocated to the thin provisioning volume and the storage capacity used for the host computer. That is, the storage area of the physical disk is wastefully allocated to the thin provisioning volume.

Further, the thin provisioning volume is disadvantageous in performance of sequential access. The thin provisioning volume is inferior to the LU in the performance of sequential access. This is because the sequential addresses on the thin provisioning volume are not necessarily matched with the sequential addresses on the physical disk. Hence, the sequential access to the thin provisioning volume may be a random access to the physical disk. As such, as the sequential access is executed more frequently, the thin provisioning volume is inferior to the LU in access performance.

An administrator is required to determine which of the thin provisioning volume and the LU is to be used for storage promotion in consideration of merits and demerits of the thin provisioning volume.

In addition, the technology of aiding in the effective use of the physical disk allocated to the LU is disclosed in JP-A-2005-092308.

SUMMARY OF THE INVENTION

The technology disclosed in JP-A-2005-092308 has no capability of aiding in the effective use of the physical disk allocated to the thin provisioning volume. Therefore, the administrator disables to determine which of the thin provisioning volume and the LU is to be used.

The present invention is made in consideration of the foregoing disadvantages, and it is an object of the present invention to provide a capacity monitoring server which is arranged to display materials for determining which of the thin provisioning volume and the LU is to be used for storage promotion.

A method for storage area management in a computer system having one or more host computers each of which provides a processor, a memory and an interface, one or more storage subsystems connected with the host computers respectively, and a management computer connected with the host computers and the storage subsystems is characterized in that the storage subsystem provides a physical disk for storing data to be requested to be written to the host computer and a disk controller for controlling transfer of data with the physical disk, the disk controller provides the host computer with a thin provisioning volume to which the storage area of the physical disk is allocated in response to the write request sent from the host computer, the host computer recognizes the provided thin provisioning volume as the volume having a larger capacity than the allocated capacity corresponding to the capacity of the storage area of the physical disk allocated to the thin provisioning volume, the management computer obtains the allocated capacity of the thin provisioning volume from the disk controller and the host-recognized capacity corresponding to the capacity of the thin provisioning volume recognized by the host computer from the host computer, calculates the improved capacity corresponding to the saved capacity of the storage area of the physical disk in the introduction of the thin provisioning volume by subtracting the obtained allocated capacity from the obtained host-recognized capacity, calculates the improvement ratio corresponding to a ratio of the improved capacity to the host-recognized capacity by dividing the calculated improved capacity by the obtained host-recognized capacity, and then displays the calculated improvement ratio.

A representative embodiment of the present invention may display materials for determining which of the thin provisioning volume and the LU is to be used for storage promotion.

Other objects, features and advantages of the invention will become apparent from the following description of the embodiments of the invention taken in conjunction with the accompanying drawings.

BRIEF DESCRIPTION OF THE DRAWINGS

FIG. 3 shows a composition of a table of a list of hosts using the volumes to be monitored, stored in the capacity monitoring server according to an embodiment of the present invention;

FIG. 4 shows a composition of a capacity storage table stored in the capacity monitoring server according to the embodiment of the present invention;

FIG. 5 is a flowchart showing a process of outputting information for determining merits and demerits in the capacity monitor, the process to be executed by the capacity monitoring server according to the embodiment of the present invention;

FIG. 15 is an explanatory diagram showing a capacity output view generated by the view display information generating module according to the embodiment of the present invention; and FIG. 16 is an explanatory diagram showing a performance display view generated by the view display information generating module according to the embodiment of the present invention.

DESCRIPTION OF THE EMBODIMENTS

Hereafter, the embodiments of the present invention will be described with reference to the appended drawings.

Figure 1:
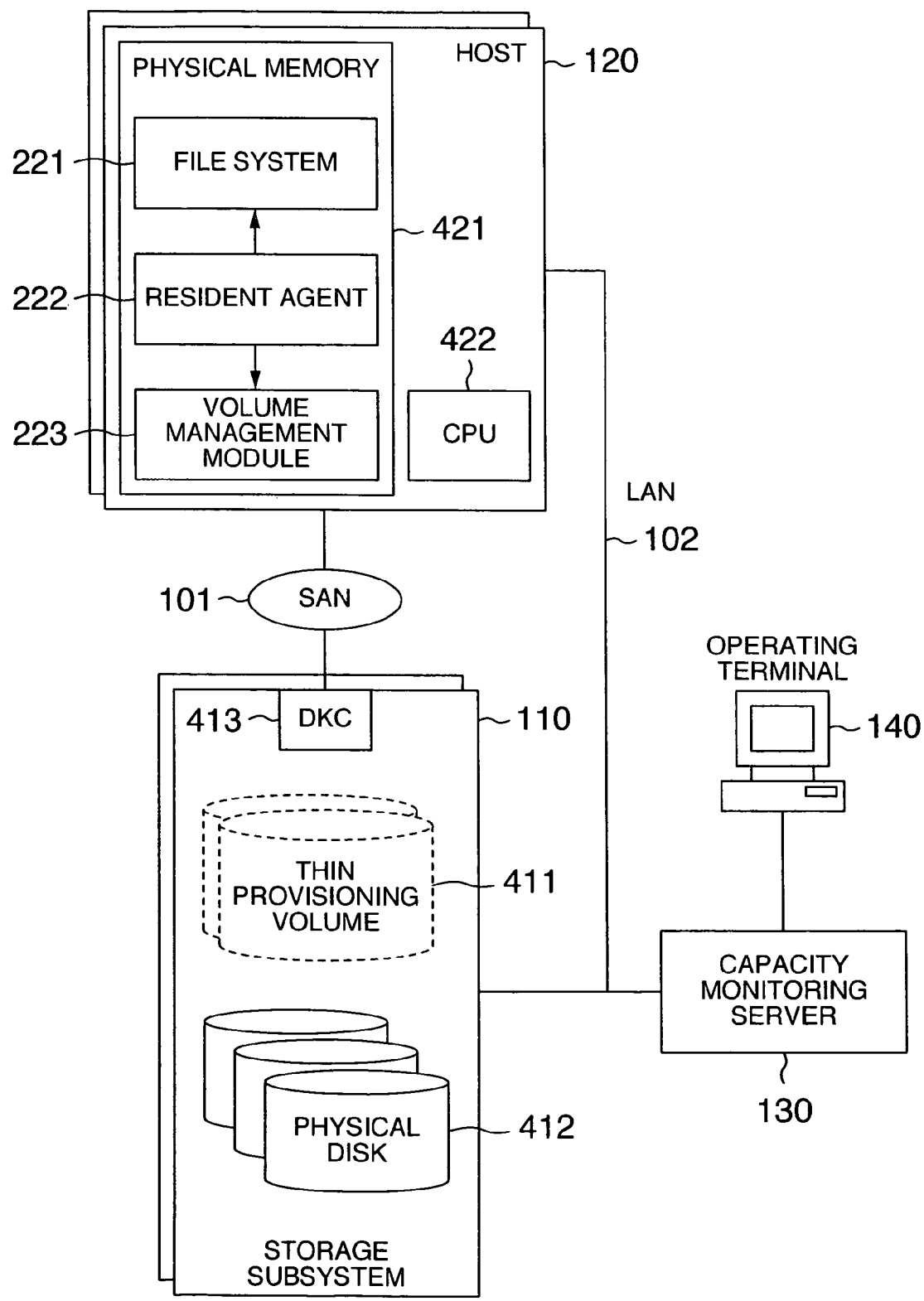
FIG. 1 is a block diagram showing an arrangement of a computer system according to an embodiment of the present invention.

FIG. 1 is a block diagram showing an arrangement of a computer system according to an embodiment of the present invention.

The computer system is arranged to have a plurality of storage subsystems 110, a plurality of host computers 120, a capacity monitoring server 130, an operating terminal 140, a SAN (Storage Area Network) 101, and a LAN (Local Area Network) 102.

The SAN 101 is a network for connecting the storage subsystem 110 with the host computer 120. The LAN 102 is a network for interconnecting the storage subsystem 110, the host computer 120 and the capacity monitoring server 130 with one another.

The storage subsystem 110 includes a disk controller (DKC) 413 and a physical disk 412. The disk controller 413 reads and writes data from and onto the physical disk 412. Further, the disk controller 413 supplies the host computer 120 with a storage area of the physical disk as the LU. Moreover, the disk controller 413 supplies the host computer 120 with the thin provisioning volume 411. In receipt of the request for write to the thin provisioning volume 411, the disk controller 413 allocates the storage area of the physical disk 412 to the thin provisioning volume 411 to which the data is requested to be written. The disk controller 413 measures various original values about the performance of the thin provisioning volume 411 and the LU and then sends the measured values about the performance to the capacity monitoring server 130. The original values about the performance include an average response time, an address of an accessed block, and so forth.

The host computer 120 includes a CPU 422, a physical memory 421, and an interface (not shown). The interface is connected with the storage subsystem 110 through the SAN 101. The interface is connected with the capacity monitoring server 130 or the like through the LAN 102. The CPU 422 executes various processes by operating the program stored in the physical memory 421. The physical memory 421 stores the program to be executed by the CPU 422 and the information required by the CPU 422. Concretely, the physical memory 421 stores a file system 221, a resident agent 222, and a volume management module 223.

The file system 221 manages files stored in the storage subsystem 110.

The resident agent 222 transfers various kinds of information with the capacity monitoring server 130. For example, the resident agent 222 calculates the host-using capacity (the capacity being used by the host) of the thin provisioning volume 411. The host-using capacity means a storage capacity used by the file system 221 and included in the storage capacity of the thin provisioning volume 411 supplied by the storage subsystem 112. Then, the resident agent 222 sends the calculated host-using capacity to the capacity monitoring server 130.

The capacity monitoring module 223 manages the thin provisioning volume 411 and the LU supplied by the storage subsystem 110.

The capacity monitoring server 130 manages the information about the thin provisioning volume 411 supplied by the storage subsystem 110. The capacity monitoring server 130 will be described in detail with reference to FIG. 2.

The operating terminal 140 is connected with the capacity monitoring server 130. The operating terminal 140 includes a display device, an input device, a storage device, a CPU, a physical memory, and so forth. The operating terminal 140 is supplied with the information from the administrator and sends the supplied information to the capacity monitoring server 130. Further, the operating terminal 140 receives the information from the capacity monitoring server 130 and displays the received information.

Figure 2:
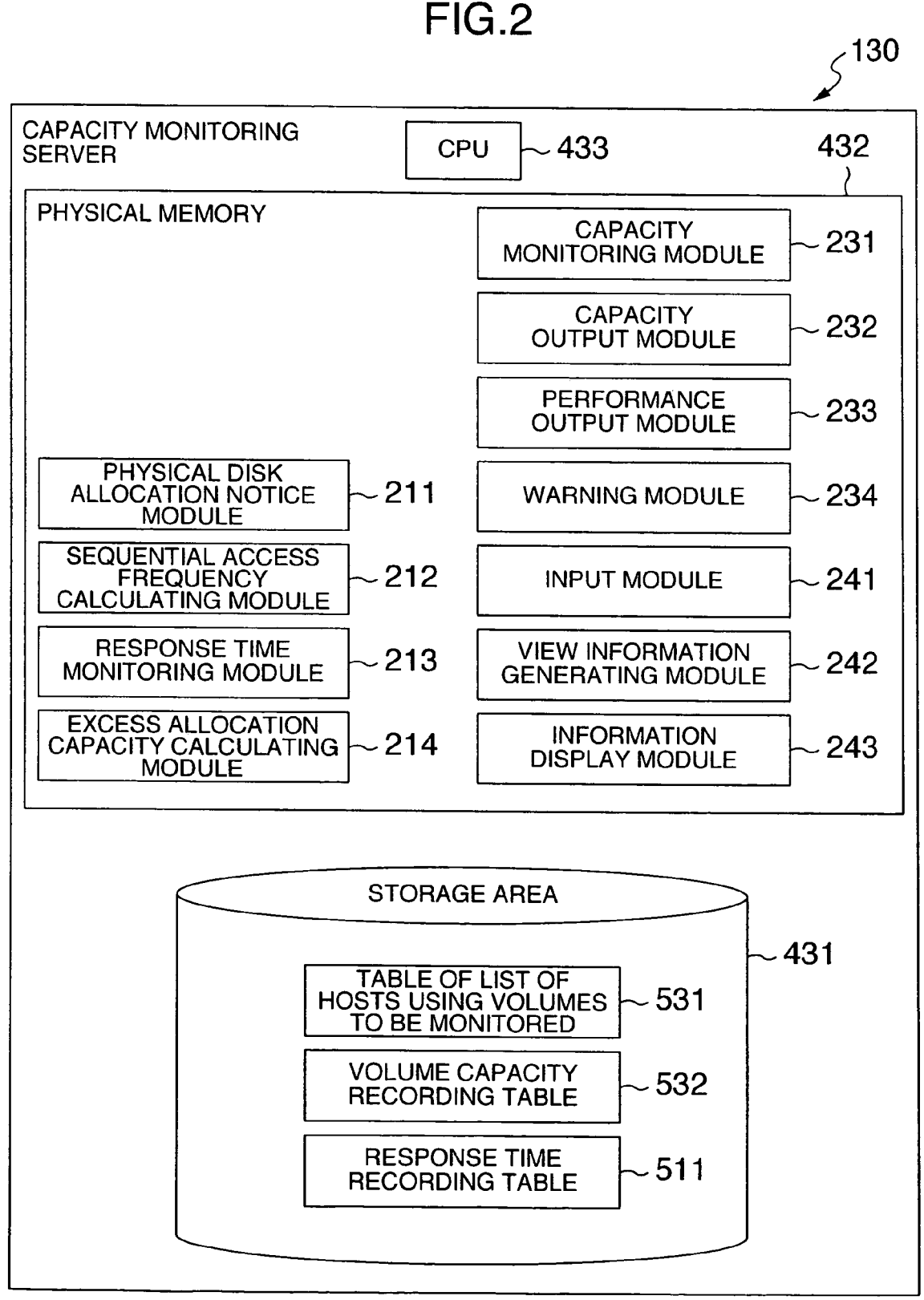
FIG. 2 is a block diagram showing an arrangement of a capacity monitoring server included in the computer system according to the embodiment of the present invention.
Figure 6:
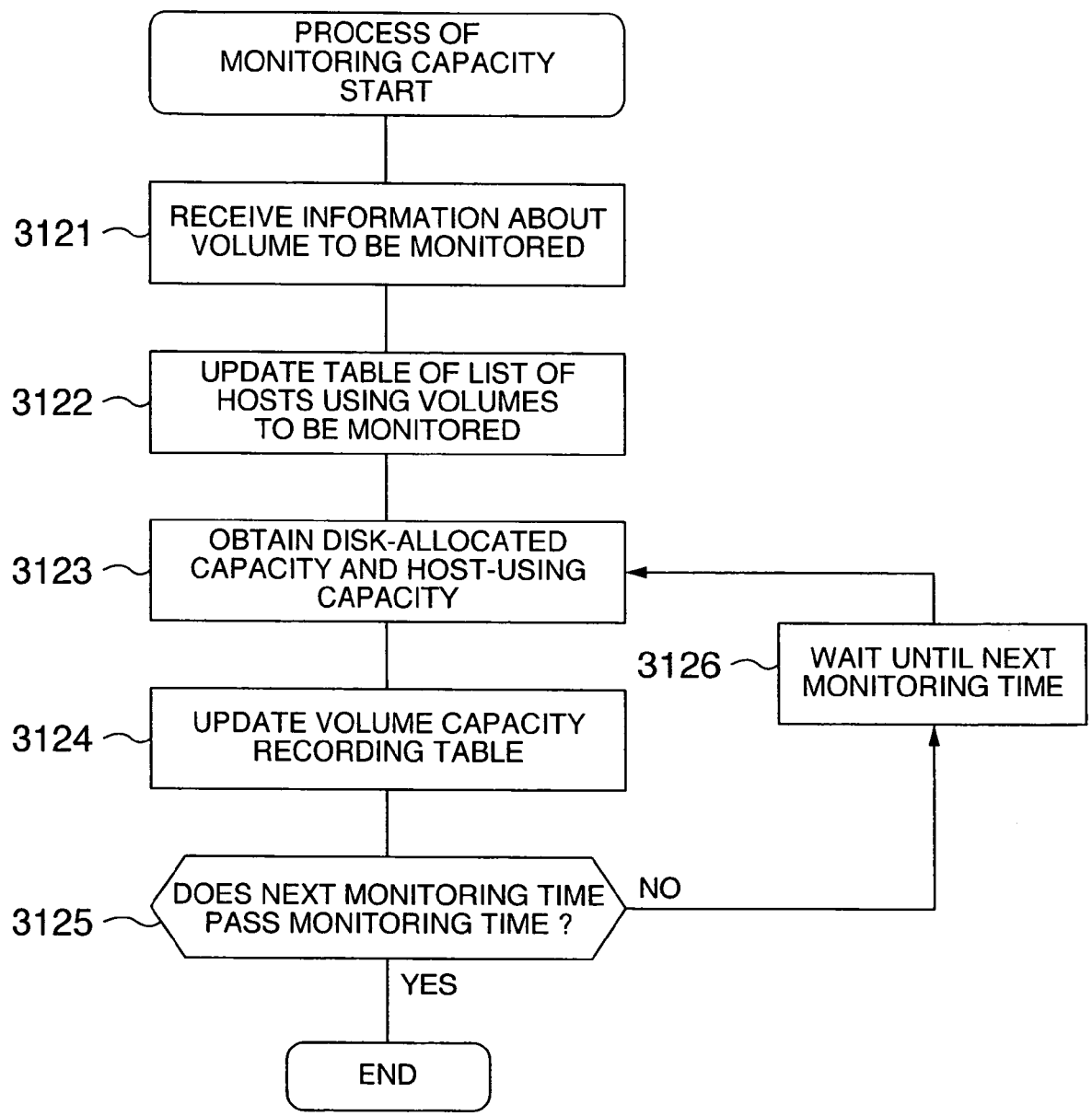
FIG. 6 is a flowchart showing a process of monitoring a capacity, the process to be executed by the capacity monitoring server according to the embodiment of the present invention.

FIG. 2 is a block diagram showing an arrangement of the capacity monitoring server 130 included in the computer system according to the embodiment of the present invention.

The capacity monitoring server 130 is arranged to have a CPU 432, a storage area 431, and an interface (not shown).

The CPU 433 executes various kinds of processes by operating the programs stored in the physical memory 432.

The physical memory 432 stores the programs to be executed by the CPU 433 and the information required by the CPU 433. Concretely, the physical memory 432 stores a physical disk allocation notice module 211, a sequential access frequency calculating module 212, a response time monitoring module 213, an excess allocation capacity calculating module 214, a capacity monitoring module 231, a capacity output module 232, a performance output module 233, a warning module 234, an input module 241, a view display information generating module 242, and an information display module 243.

The physical disk allocation notice module 211 obtains the allocated capacity and the maximum capacity of the thin provisioning volume 411 to be monitored. The maximum capacity is a storage capacity recognized by the host computer 120. The allocated capacity is a capacity of a storage area of the thin provisioning volume 411 in which the storage area of the physical disk 412 has been already allocated.

Then, the physical disk allocation notice module 211 sends the allocated capacity and the maximum capacity of the obtained thin provisioning volume 411 to the capacity monitoring module 231.

The sequential access frequency calculating module 212 receives the array in which the addresses of the accessed blocks are ranged in sequence from the storage subsystem 110. The concerned block is a storage area included in the thin provisioning volume 411. The sequential access frequency calculating module 212 calculates the correlation coefficient of the sequential access from the obtained array.

The response time monitoring module 213 receives the average response time of an access to the thin provisioning volume 411 from the storage subsystem 110.

The excess allocation capacity calculating module 214 calculates an excess allocation ratio, an excess allocation capacity, an improvement ratio, and an improved capacity of the thin provisioning volume 411. The excess allocation ratio, the excess allocation capacity, the improvement ratio and the improved capacity will be described in detail with reference to FIG. 8.

The capacity monitoring module 231 receives the allocated capacity and the maximum capacity of the thin provisioning volume 411 from the physical disk allocation notice module 211. Then, the capacity monitoring module 231 stores the received allocated capacity and maximum capacity of the thin provisioning volume 411 in the volume capacity recording table 532.

Further, the capacity monitoring module 231 receives the host-using capacity of the thin provisioning volume 411 from the resident agent 222 of the host computer 120. Then, the capacity monitoring module 231 stores the received host-using capacity of the thin provisioning volume 411 in the volume capacity recording table 532.

The capacity output module 232 extracts the information about the thin provisioning volume 411 specified by the administrator from the volume capacity recording table 532.

The performance output module 233 extracts the correlation coefficient and the average response time about the thin provisioning volume 411 specified by the administrator from the correlation coefficient of the sequential access calculated by the serial access frequency calculating module 212 and the average response time received by the response time monitoring module 213.

If the thin provisioning volume 411 specified by the administrator meets the predetermined condition, the warning module 234 outputs a warning to at least one of the capacity monitoring server 130 and the operating terminal 140.

The input module 241 is supplied with various kinds of information from the administrator. In addition, the administrator may enter various kinds of information into any one of the operating terminal 140 and the capacity monitoring server 130.

The view information generating module 242 generates a view displayed on at least one of the capacity monitoring server 130 and the operating terminal 140. For example, the view information generating module 242 generates a view having the information about the thin provisioning volume 411 extracted by the capacity output module 232. Moreover, the view information generating module 242 generates a view having the excess allocation ratio, the excess allocation capacity, the improvement ratio and the improved capacity calculated by the excess allocation capacity calculating module 214. Further, the view information generating module 242 generates a view having the correlation coefficient and the average response time extracted by the performance output module 233.

The information display module 243 displays the view generated by the view information generating module 242 on at least one of the capacity monitoring server 130 and the operating terminal 140.

The storage area 431 stores various kinds of information. Concretely, the storage area 431 stores a table 531 of a list of hosts using the volumes to be monitored, a volume capacity recording table 532, and a response time recording table 511.

The list table 531 stores the correspondence between the thin provisioning volumes 411 to be monitored and the host computers 120 to be accessed to the concerned thin provisioning volumes 411. In addition, the list table 531 will be described in detail with reference to FIG. 3.

The volume capacity recording table 532 stores the disk-allocated capacity (the capacity allocated to the disk), the host-using capacity, the maximum capacity and so forth of the thin provisioning volume 411 to be monitored. In addition, the volume capacity recording table 532 will be described in detail with reference to FIG. 4.

The response time recording table 511 stores an average response time received by the response time monitoring module 213.

FIG. 3 shows a composition of the table 531 of a list of hosts using the volumes to be monitored, the list table 531 being stored in the capacity monitoring server 130 according to the embodiment of the present invention.

The list table 531 includes a thin provisioning volume ID for storage (TPVol ID for storage) 5311, a host ID 5312, a thin provisioning volume ID for host (TPVol ID for host) 5313, a monitoring interval 5314, and a monitoring limit 5315.

The TPVol ID 5311 for storage is an identifier to be used by the storage subsystem 110 for uniquely identifying the thin provisioning volume 411. The host ID 5312 is a unique identifier of a host computer 120 that accesses the thin provisioning volume 411 identified by the TPVol ID 5311 for storage of the concerned record.

The TPVol ID 5323 for host is an identifier to be used by the host computer 120 for uniquely identifying the thin provisioning volume 411 identified by the TPVol ID 5311 for storage of the concerned record.

The monitoring interval 5314 is an interval at which the information about the thin provisioning volume 411 identified by the TPVol ID 5311 for storage of the concerned record is obtained. The monitoring limit 5315 is a time limit at which continued is the acquisition of the information about the thin provisioning volume 411 identified by the TPVol ID 5311 for storage of the concerned record.

FIG. 4 shows a composition of the volume capacity recording table 532 stored in the capacity monitoring server 130 according to the embodiment of the present invention.

The volume capacity recording table 532 includes a thin provisioning volume ID for storage (TPVol ID for storage)

5321, the disk-allocated capacity 5322, the host-using capacity 5323, the maximum capacity 5324, and the monitoring time 5325.

The TPVol ID 5321 for storage is an identifier to be used by the storage subsystem 110 for uniquely identifying the thin provision volume 411.

The disk-allocated capacity 5322 is a capacity of a storage area of the physical disk 412 having been allocated to the thin provisioning volume 411 identified by the TPVol ID 5321 for storage of the concerned record. The host-using capacity 5323 is a storage capacity of the thin provisioning volume 411 identified by the TPVol ID 5321 for storage of the concerned record, the storage capacity used by the host computer 120.

The maximum capacity 5324 is a storage capacity of the thin provisioning volume 411 identified by the TPVol ID 5321 for storage of the concerned record. That is, the host computer 120 recognizes the thin provisioning volume 411 as the volume having the storage area of the maximum capacity 5324.

The monitoring time 5325 is a date and a time at which the information stored in the concerned record is obtained.

FIG. 5 is a flowchart showing a process of outputting the information on which the merits and the demerits are determined on the basis of the capacity, the process being executed by the capacity monitoring server 130 according to the embodiment of the present invention.

At first, the capacity monitoring server 130 executes a process of obtaining a capacity (Step 313). This process causes the capacity monitoring server 130 to extract the information about the thin provisioning volume 411 to be displayed from the volume capacity recording table 532. The process of obtaining a capacity will be described in detail with reference to FIG. 7.

Then, the capacity monitoring server 130 executes a process of displaying a capacity (Step 314). This process causes the capacity monitoring server 130 to display the information about the thin provisioning volume 411 to be displayed. The process of displaying a capacity will be described in detail with reference to FIG. 8.

In addition, instead of the process of displaying a capacity, the capacity monitoring server 130 may execute a process of outputting a warning. The process of outputting a warning will be described in detail with reference to FIG. 14.

Then, the capacity monitoring server 130 terminates the process of outputting the information on which the merits and demerits are determined on the basis of the capacity.

The process of monitoring a capacity is executed in Step 312 of the process of outputting the information on which the merits and demerits are determined on the basis of the capacity (see FIG. 5).

The administrator enters information about the thin provisioning volume 411 to be monitored on the operating terminal 140. The information about the thin provisioning volume 411 to be monitored includes a TPVol ID for storage, a host ID, a TPVol ID for host, a monitoring interval, and a monitoring limit. When the information is entered, the operating terminal 140 is served to transmit to the capacity monitoring server 130 the entered information about the thin provisioning volume 411.

The administrator may enter onto the operating terminal 140 only the TPVol ID for storage, the monitoring interval and the monitoring limit of the thin provisioning volume 411 to be monitored. In this case, the operating terminal 140 stores the correspondence between the TPVol ID for storage, the host ID and the TPVol ID for host. Then, the operating terminal 140 specifies the host ID and the TPVol ID for host corresponding to the inputted TPVol ID for storage. Next, the operating terminal 140 is served to transmit the entered TPVol ID for storage, the specified host ID, the specified TPVol ID for host, the entered monitoring interval, and the entered monitoring limit to the capacity monitoring server 130.

The input module 241 of the capacity monitoring server 130 receives the information about the thin provisioning volume 411 from the operating terminal 140 (Step 3121).

Then, the capacity monitoring module 231 of the capacity monitoring server 130 generates or updates the table 531 of a list of hosts using the volume to be monitored, based on the information received by the input module 241 (Step 3122).

Concretely, the capacity monitoring module 231 generates a new record in the table 531 of a list of hosts using the volume to be monitored. Then, the module 231 stores the TPVol ID for storage included in the information received in the input module 241 in the TPVol ID 5311 for storage of a new record. Next, the module 231 stores the host ID included in the information received by the input module 241 in the host ID 5312 of a new record.

Then, the module 231 stores the TPVol ID for host included in the information received by the input module 241 in the TPVol ID 5313 for host of a new record. Next, the module 231 stores the monitoring interval included in the information received by the input module 241 in the monitoring interval 5314 of a new record. Further, the module 231 stores the monitoring limit included in the information received by the input module 241 in the monitoring limit 5315 of a new record.

Then, the capacity monitoring server 130 obtains the disk-allocated capacity and the host-using capacity (Step 3123). The capacity monitoring server 130 may obtain the disk-allocated capacity, the host-using capacity and the maximum capacity at a time or obtain them in sequence.

Concretely, the capacity monitoring module 231 of the capacity monitoring server 130 extracts the TPVol ID 5311 for storage from the list table 531. Then, the capacity monitoring module 231 passes the extracted TPVol ID 5311 for storage to the physical disk allocation notice module 211 of the capacity monitoring server 130.

Then, the allocation notice module 211 obtains from the storage subsystem 110 the disk-allocated capacity and the maximum capacity of the thin provisioning volume 411 identified by the TPVol ID 5311 for storage received by the module 211 itself. Next, the module 211 passes the obtained disk-allocated capacity and maximum capacity to the capacity monitoring module 231.

Further, the capacity monitoring module 231 of the capacity monitoring server 130 extracts the host ID 5312 and the TPVol ID 5313 for host from the list table 531. Next, the module 231 sends the extracted TPVol ID 5313 for host to the resident agent 222 of the host computer 120 identified by the extracted host ID 5312.

Then, the resident agent 222 calculates the host-using capacity of the thin provisioning volume 411 identified by the received TPVol ID 5313 for host. Next, the resident agent 222 sends the calculated host-using capacity to the capacity monitoring module 231 of the server 130.

Next, the capacity monitoring server 130 updates the volume capacity recording table 532 (3124).

Concretely, the capacity monitoring module 231 of the capacity monitoring server 130 generates a new record in the volume capacity recording table 532. Next, the capacity monitoring module 231 stores the extracted TPVol ID 5311 for storage in the TPVol ID 5321 for storage of the new record.

Next, the capacity monitoring module 231 stores the disk-allocated capacity received from the physical disk allocation notice module 211 in the disk-allocated capacity 5322 of the new record. Then, the module 231 stores the host-using capacity received from the resident agent 222 in the host-using capacity 5323 of the new record. Next, the module 231 stores the maximum capacity received from the notice module 211 in the maximum capacity 5324 of the new record. Further, the module 231 stores a current time in the monitoring time 5325 of the new record.

The foregoing process causes the capacity monitoring server 130 to update the volume capacity recording table 532.

Then, the capacity monitoring module 231 of the capacity monitoring server 130 extracts the TPVol ID 5321 for storage and the monitoring time 5325 from the new record added to the volume capacity recording table 532. Next, the capacity monitoring module 231 selects from the list table 531 a record in which the extracted TPVol ID 5321 for storage is matched to the TPVol ID 5311 of the list table 531.

Next, the capacity monitoring module 231 extracts the monitoring interval 5314 and the monitoring limit 5315 from the selected record. Then, the module 231 adds the extracted monitoring interval 5314 to the extracted monitoring time 5325, for calculating the next monitoring time. Next, the module 231 determines whether or not the calculated next monitoring time passes the extracted monitoring time 5315 (Step 3125).

Unless the next monitoring time passes the monitoring limit 5315, the module 231 is waiting until the calculated next monitoring time (Step 3126). Afterwards, the module 231 goes back to Step 3123. Then, the capacity monitoring module 231 monitors the capacity of the thin provisioning volume 411 again and updates the volume capacity recording table 532

On the other hand, if the next monitoring time passes the monitoring limit 5315, the module 231 does not need to monitor the capacity of the thin provisioning volume 411 again. Therefore, the module 231 terminates the capacity monitoring process.

Figure 7:
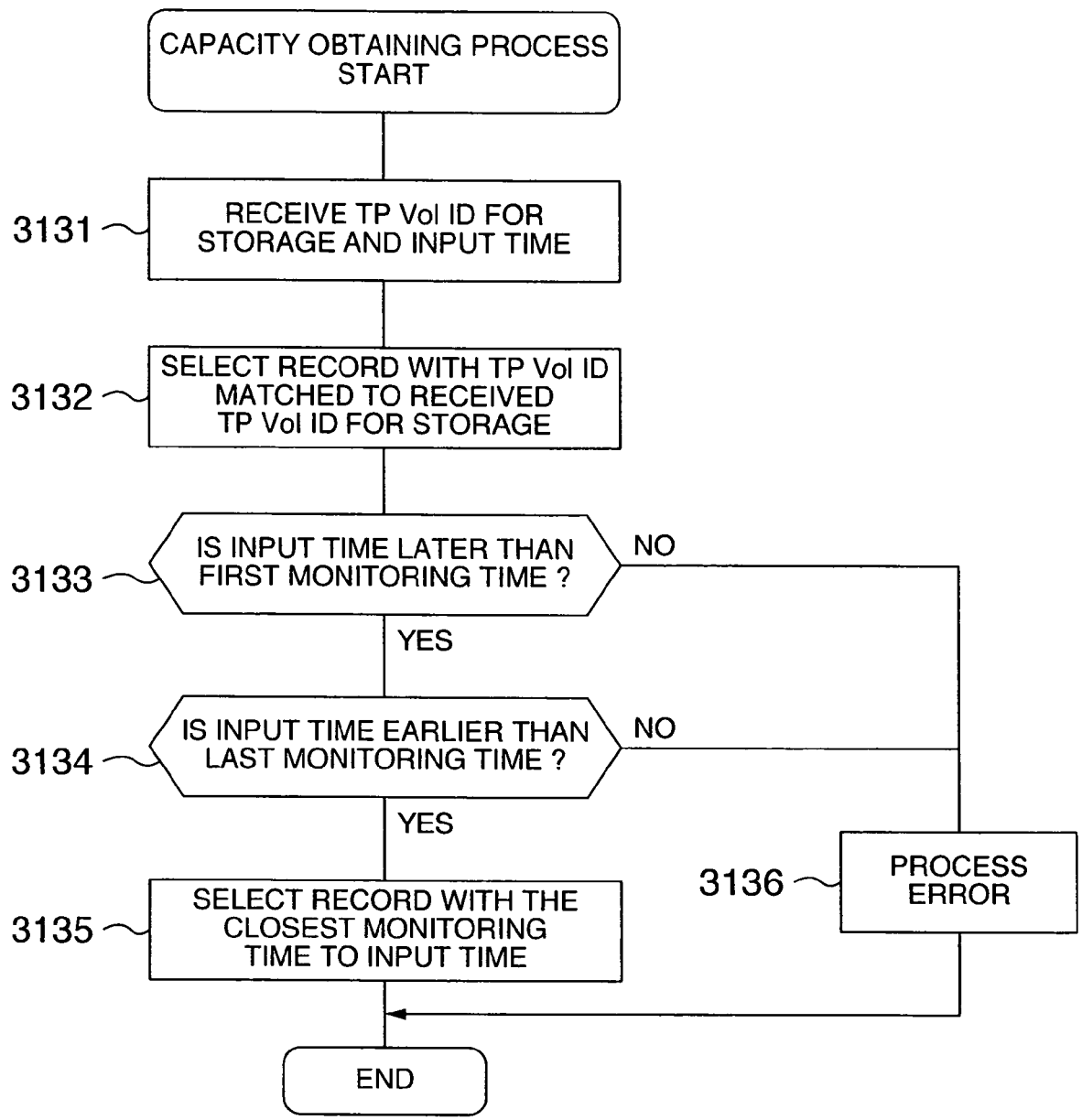
FIG. 7 is a flowchart showing a process of obtaining a capacity, the process to be executed by the capacity monitoring server according to the embodiment of the present invention.

FIG. 7 is a flowchart showing a process of obtaining a capacity, the process being executed by the capacity monitoring server 130 according to the embodiment of the present invention.

The capacity obtaining process is executed in Step 313 of the process (see FIG. 5) of outputting the information on which the merits and demerits are determined on the basis of the capacity.

The administrator enters onto the operating terminal 140 a TPVol ID for storage of the thin provisioning volume 411 to be displayed and a time to be displayed. Then, the operating terminal 140 is served to send the entered TPVol ID for storage and the entered time to be displayed to the capacity monitoring server 130.

The input module 241 of the capacity monitoring server 130 selects all the records (volume-matched records) in which the TPVol ID for storage received by the input module 241 is matched to the TPVol ID 5321 of the volume capacity recording table 532 from the table 532 (Step 3132).

Then, the capacity output module 232 of the capacity monitoring server 130 determines whether or not the earlier time than the to-be-displayed time received by the input module 241 is stored in any monitoring time 5325 of the selected volume-matched records. Based on the determination, the module 232 determines whether or not the to-be-displayed time is later than the time when the concerned thin provisioning volume 411 is monitored at first (Step 3133).

If the to-be-displayed time is earlier than the first monitoring time, the capacity output module 232 disables to display the information corresponding with the to-be-displayed time. This causes the capacity output module 232 to execute an error process of notifying the operating terminal 140 of an error (Step 3136). Then, the capacity monitoring server 130 terminates the capacity obtaining process.

On the other hand, if the to-be-displayed time is later than the first monitoring time, the capacity output module 232 determines whether or not the time later than the to-be-displayed time received by the input module 241 is stored in any monitoring time 5325 of the selected volume-matched records. This causes the capacity output module 232 to determine whether or not the to-be-displayed time is earlier than the time when the concerned thin provisioning volume 411 is monitored lastly (Step 3134).

If the to-be-displayed time is later than the last monitoring time, the capacity output module 232 disables to display the information corresponding with the to-be-displayed time. This causes the capacity output module 232 to execute an error process of notifying the operating terminal 140 of an error (3136). Then, the capacity monitoring server 130 terminates the capacity obtaining process.

On the other hand, if the to-be-displayed time is earlier than the last monitoring time, the capacity output module 232 selects a record (to-be-displayed record) that includes the closest monitoring time 5325 to the to-be-displayed time received by the input module 241 from the selected volume-matched records (Step 3135). Then, the capacity output module 232 passes the selected to-be-displayed (or target) record to the excess allocation capacity calculating module 214 and the view information generating module 242. Then, the capacity monitoring server 130 terminates the capacity obtaining process.

Figure 8:
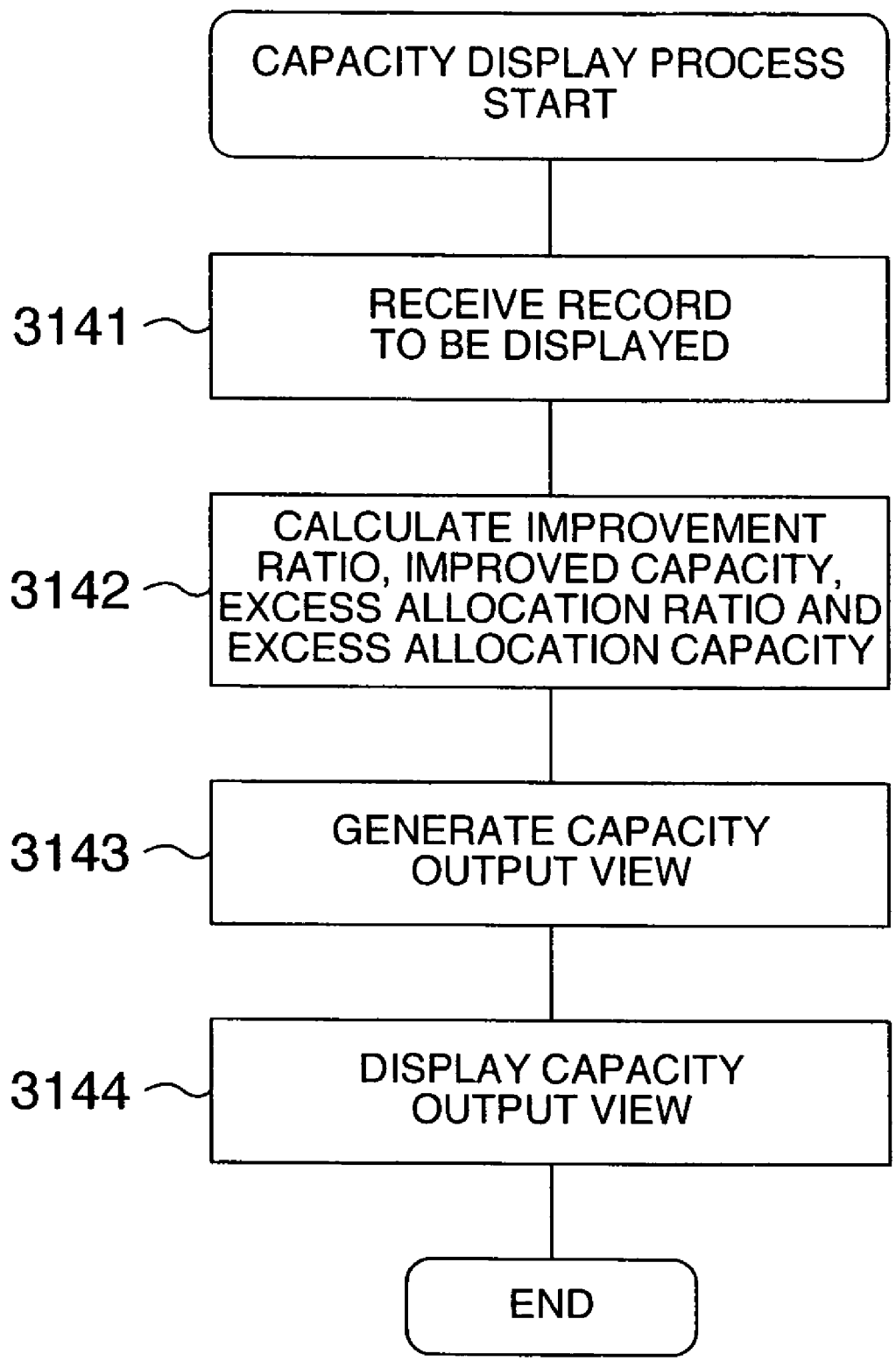
FIG. 8 is a flowchart showing a process of displaying a capacity, the process to be executed by the capacity monitoring server according to the embodiment of the present invention.

FIG. 8 is a flowchart showing a process of displaying a capacity, the process being executed by the capacity monitoring server according to the embodiment of the present invention.

The capacity displaying process is executed in Step 314 of the process of outputting the information on which the merits and demerits are determined on the basis of the capacity (see FIG. 5).

The excess allocation capacity calculating module 214 and the view information generating module 242 included in the capacity monitoring server 130 receive the target record selected in Step 3135 of the capacity obtaining process (see FIG. 7) from the capacity output module 232 (Step 3141).

Then, the excess allocation capacity calculating module 214 calculates an improvement ratio, an improved capacity, an excess allocation ratio and an excess allocation capacity of the thin provisioning volume 411 based on the target record received by the module 214 itself (Step 3142).

Concretely, the excess allocation capacity calculating module 214 derives the improved capacity from the following expression (1):

$$Ia = T - A \qquad (1)$$

where T is a maximum capacity 5324 of the target record and A is a disk-allocated capacity 5322 of the target record.

As such, the improved capacity Ia is a difference between the maximum capacity of the thin provisioning volume 411 and the disk-allocated capacity of the thin provisioning volume 411. That is, the improved capacity Ia means a capacity of a storage area of the physical disk 412 saved by the thin provisioning volume 411 more than the storage area required when the LU having the same capacity as the thin provisioning volume 411 is supplied to the host computer 120. The LU having the same capacity as the thin provisioning volume 411 needs the physical disk 412 with the same capacity as the maximum capacity of the thin provisioning volume 411.

Further, the excess allocation capacity calculating module 214 derives the improvement ratio Ir from the following expression (2):

$$Ir=Ia/T \qquad (2)$$

As such, the improvement ratio Ir is a ratio of the improved capacity Ia to the maximum capacity of the thin provisioning volume 411. That is, the improvement ratio Ir is a ratio of a capacity of the physical disk 412 saved by the than provisioning volume 411 more than the capacity of the physical disk 412 required when the thin provisioning volume is changed into the LU.

If the improvement ratio Ir is great, the storage area of the physical disk 412 is not allocated only to part of the thin provisioning volume 411. That is, the introduction of the thin provisioning volume 411 allows the storage area of the physical disk 412 to be saved far more.

Conversely, if the improvement ratio Ir is small, the storage area of the physical disk 412 is allocated to almost of the thin provisioning volume 411. That is, the introduction of the thin provisioning volume 411 does not offer a substantial advantage. It means that the storage area of the physical disk 412 is hardly saved.

Further, the excess allocation capacity calculating module 214 derives the excess allocation capacity Oa from the following expression (3):

$$Oa=A-U \qquad (3)$$

where U is a host-using capacity 5323 of the target record.

As such, the excess allocation capacity Oa is a difference between the disk-allocated capacity of the thin provisioning volume 411 and the host-using capacity of the thin provisioning volume 411. That is, the excess allocation capacity Oa means the capacity of the physical disk 412 allocated to the thin provisioning volume 411 but not being used by the host computer 120.

Further, the excess allocation capacity calculating module 214 derives the excess allocation ratio Or from the following expression (4):

$$Or=Oa/A \qquad (4)$$

As such, the excess allocation ratio Or is a ratio of the excess allocation capacity Oa to the disk-allocated capacity of the thin provisioning volume 411.

If the excess allocation ratio Or is great, much of the storage area of the physical disk 412 allocated to the thin provisioning volume 411 is used by the host computer 120. That is, almost of the storage area of the physical disk 412 allocated to the thin provisioning volume 411 is not wasted.

As described above, the excess allocation capacity calculating module 214 calculates the improvement ratio, the improved capacity, the excess allocation ratio and the excess allocation capacity of the thin provisioning volume 411.

Then, the view information generating module 242 of the capacity monitoring server 130 generates a capacity output view (see FIG. 9) (Step 3143).

Figure 9:
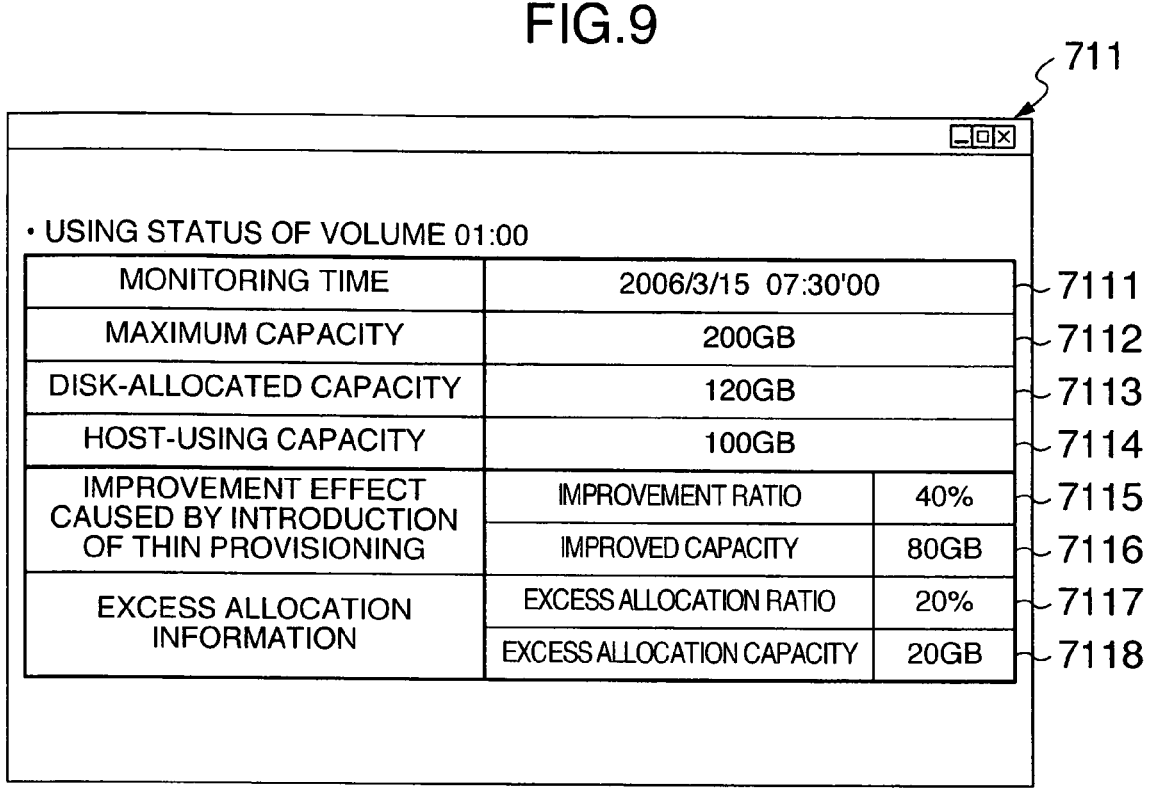
FIG. 9 is an explanatory diagram showing a capacity output view generated by a view display information generating module according to an embodiment of the present invention.

FIG. 9 is an explanatory diagram showing a capacity output view 711 generated by the view information generating module 242 according to the embodiment of the present invention.

The capacity output view 711 includes information about the thin provisioning volume 411 specified as the display target by the administrator. Concretely, the capacity output view 711 includes a monitoring time 7111, a maximum capacity 7112, a disk-allocated capacity 7113, a host-using capacity 7114, an improvement ratio 7115, an improved capacity 7116, an excess allocation ratio 7117, and an excess allocation capacity 7118.

Turning to FIG. 8, the view information generating module 242 generates the capacity output view 711 based on the values calculated about the received target record by the excess allocation capacity calculating module 214.

Concretely, the view information generating module 242 stores the monitoring time 5325 of the target record in the monitoring time 7111 of the capacity output view 711. Then, the view information generating module 242 stores the maximum capacity 5324 of the target record in the maximum capacity 7112 of the capacity output view 711. Next, the view information generating module 242 stores the host-using capacity 5323 of the target record in the host-using capacity 7114 of the capacity output view 711.

Then, the view information generating module 242 stores the improvement ratio calculated by the excess allocation capacity calculating module 214 in the improvement ratio capacity 7115 of the capacity output view 711. Next, the view information generating module 242 stores the excess allocation capacity calculated by the excess allocation capacity calculating module 214 in the excess allocation capacity 7118 of the capacity output view 711.

As described above, the view information generating module 242 generates the capacity output view 711.

Next, the information display module 243 of the capacity monitoring server 130 transmits to the operating terminal 140 the capacity output view 711 generated by the view information generating module 242. In response, the operating terminal 140 displays the received capacity output view 711. The information display module 243 of the capacity monitoring server 130 may display the capacity output view 711 generated by the view information generating module 242 on the display device of the concerned capacity monitoring server 130. Then, the capacity monitoring server 130 terminates the capacity display process.

The administrator determines if the storage promotion of the thin provisioning volume is to be continued by referring to the capacity output view 711. Concretely, the administrator determines if the storage promotion of the thin provisioning volume 411 is to be continued based on the improvement ratio, the excess allocation ratio, and so forth of the thin provisioning volume 411.

The administrator hopes that the thin provisioning volume 411 has a greater improvement ratio than the predetermined value. Hence, if the improvement ratio of the thin provisioning volume 411 is smaller than the predetermined value, the administrator determines that the concerned thin provisioning volume 411 should be shifted to the LU.

The improvement ratio is a ratio of a capacity of a storage area of the physical disk 412 saved by the introduction of the thin provisioning volume to a capacity of a storage area of the physical disk 412 required when the thin provisioning volume is changed into the LU.

If the improvement ratio is greater than the predetermined value, the storage area of the physical disk 412 is allocated only to part of the thin provisioning volume 411. It means that the introduction of the thin provisioning volume 411 causes the storage area of the physical disk 412 to be saved far more. Hence, the administrator determines that the storage promotion of the concerned provisioning volume 411 should be continued.

If the improvement ratio is smaller than the predetermined value, the storage area of the physical disk 412 is allocated to the almost of the thin provisioning volume 411. That is, the introduction of the thin provisioning volume 411 does not offer any advantage. The storage area of the physical disk 412 is hardly saved. Hence, the administrator determines that the concerned thin provisioning volume 411 should be shifted to the LU.

Further, the administrator hopes that the excess allocation ratio of the thin provisioning volume 411 is equal to or smaller than the predetermined value. Hence, if the excess allocation ratio of the thin provisioning volume 411 is greater than the predetermined value, the administrator determines that the concerned thin provisioning volume 411 should be shifted to the LU.

The excess allocation ratio is a ratio of the excess allocation capacity to the disk-allocated capacity of the thin provisioning volume 411. The excess allocation capacity is a capacity of the physical disk 412 allocated to the thin provisioning volume 411 and not being used by the host computer 120.

If the excess allocation ratio is less than or equal to the predetermined value, almost of the storage area of the physical disk 412 allocated to the thin provisioning volume 411 is used by the host computer 120. That is, the storage area of the physical disk 412 allocated to the thin provisioning volume 411 is hardly wasted. Hence, the thin provisioning volume 411 is effective in preventing the wasteful allocation of the storage area of the physical disk 412. Hence, the administrator determines that the promotion of the concerned thin provisioning volume 411 should be continued.

On the other hand, if the excess allocation ratio is greater than the predetermined value, the storage area of the physical disk 412 allocated to the thin provisioning volume 411 is hardly used by the host computer 120. That is, almost of the storage area of the physical disk 412 allocated to the thin provisioning volume 411 is wasted. Hence, the thin provisioning volume 411 is not effective in preventing the wasteful allocation of the storage area of the physical disk 412. Hence, the administrator determines that the concerned thin provisioning volume 411 should be shifted to the LU.

The administrator hopes that the improvement ratio of the thin provisioning volume 411 is 20% or more. Further, the administrator also hopes that the excess allocation ratio of the thin provisioning volume 411 is 30% or less.

At first, the description will be oriented to the case in which the capacity display view 711 described with reference to FIG. 9 is displayed.

On the capacity display view 711 shown in FIG. 9, the improvement ratio 7115 is 40%. That is, since the improvement ratio 7115 is 20% or more, this ratio meets the hope of the administrator. On the capacity display view 711 shown in FIG. 9, the excess allocation ratio 7117 is 20%. That is, since the excess allocation ratio 7117 is 30% or less, this value meets the hope of the administrator.

As described above, on the capacity display view 711 shown in FIG. 9, both of the improvement ratio 711 and the excess allocation ratio 7117 meet the hope of the administrator. Hence, the administrator determines that the storage promotion of the concerned thin provisioning volume 411 should be continued.

Figure 10:
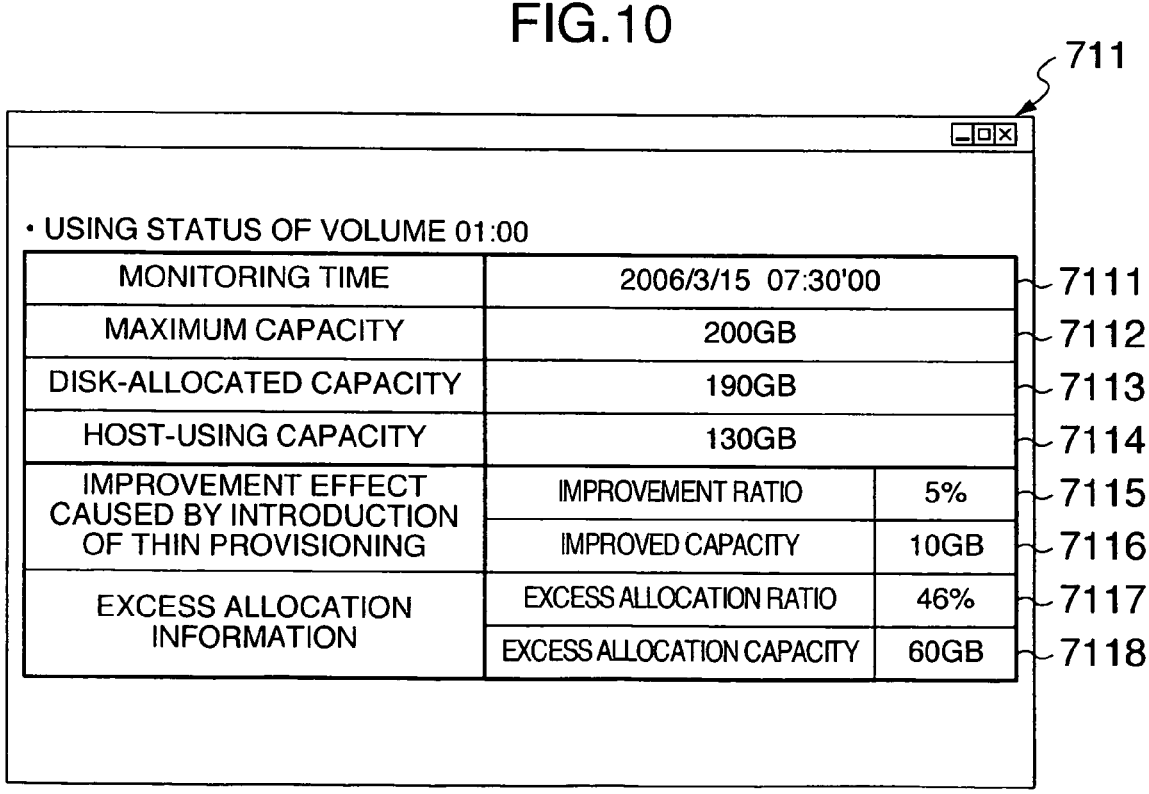
FIG. 10 is an explanatory diagram showing a capacity output view generated by the view display information generating module according to the embodiment of the present invention.

In turn, description will be oriented to the case in which the capacity display view 711 shown in FIG. 10 is displayed.

FIG. 10 is an explanatory view showing the capacity output view 711 generated by the view information generating module 242 according to the embodiment of the present invention.

The capacity output view 711 shown in FIG. 10 includes the monitoring time 7111, the maximum capacity 7112, the disk-allocated capacity 7113, the host-using capacity 7114, the improvement ratio 7115, the improved capacity 7116, the excess allocation ratio 7117, and the excess allocation capacity 7118. Those are the same as those included in the capacity output screen shown in FIG. 9. Hence, the description thereabout is left out.

On the capacity display view 711 shown in FIG. 10, the improvement ratio 7115 is 5%. That is, since the improvement ratio 7115 is smaller than 20%, this ratio does not meet the hope of the administrator. Further, on the capacity display view 711 shown in FIG. 10, the excess allocation ratio 7117 is 46%. That is, since the excess allocation ratio 7117 is greater than 30%, this ratio does not meet the hope of the administrator.

As described above, on the capacity display view 711 shown in FIG. 10, neither of the improvement ratio 7115 and the excess allocation ratio 7117 meet the hope of the administrator. Hence, the administrator determines that the concerned thin provisioning volume 411 should be shifted to the LU.

Figure 11:
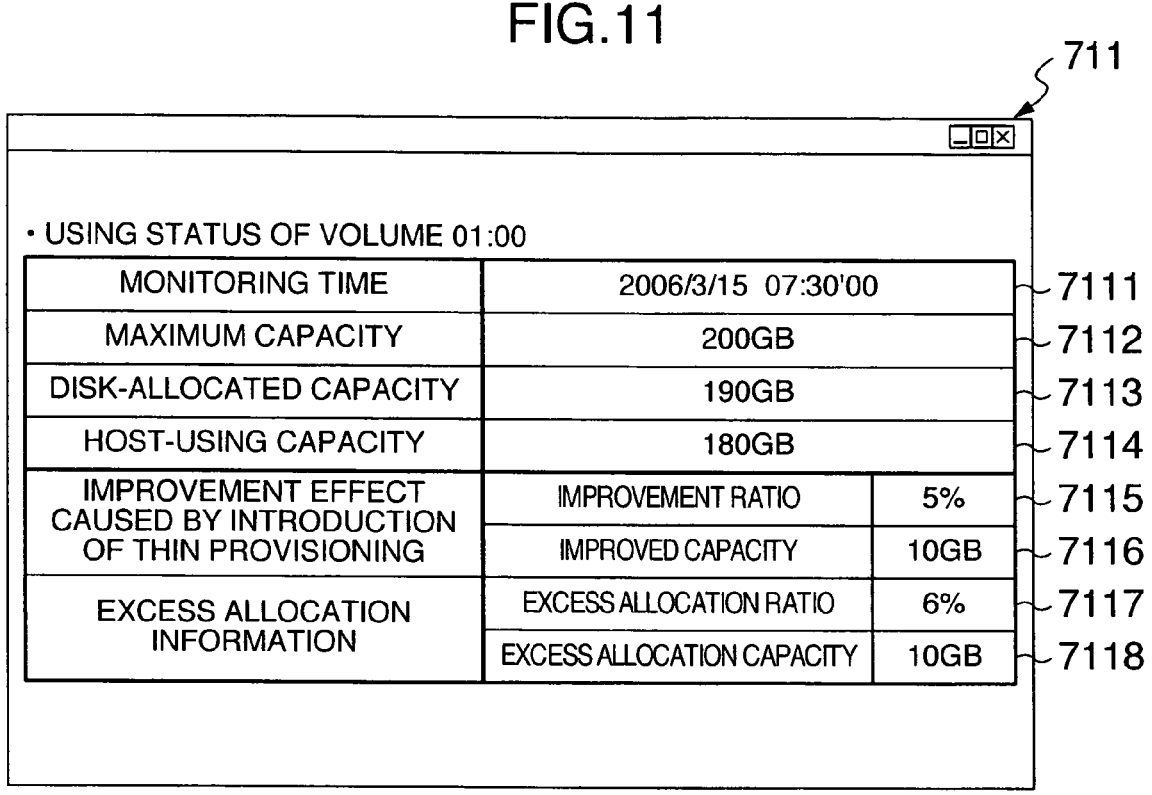
FIG. 11 is an explanatory diagram showing a capacity output view generated by the view display information generating module according to the embodiment of the present invention.

Next, description will be oriented to the case in which the capacity display view 711 shown in FIG. 11 is displayed.

FIG. 11 is an explanatory view showing the capacity output view 711 generated by the view information generating module 242 according to the embodiment of the present invention.

The capacity output view 711 shown in FIG. 11 includes the monitoring time 7111, the maximum capacity 7112, the disk-allocated capacity 7113, the host-using capacity 7114, the improvement ratio 7115, the improved capacity 7116, the excess allocation ratio 7113, and the excess allocation capacity 7118. Those are the same as those included in the capacity output screen described with reference to FIG. 9. Hence, the description thereabout is left out.

On the capacity display view 711 shown in FIG. 11, the improvement ratio 7115 is 5%. That is, since the improvement ratio 7115 is smaller than 20%, this ratio does not meet the hope of the administrator. Further, on the capacity display view 711 shown in FIG. 11, the excess allocation ratio 7117 is 6%. That is, since the excess allocation ratio 7117 is 30% or less, this ratio meets the hope of the administrator.

As described above, on the capacity display view 711 shown in FIG. 11, only the excess allocation ratio 7117 meets the hope of the administrator. In this case, the introduction of the thin provisioning volume 411 is effective in preventing the excess allocation of the physical disk 412. Hence, the administrator determines that the storage promotion of the concerned thin provisioning volume 411 should be continued without shifting to the LU.

However, the physical disk 412 has been already allocated to almost of the capacity of the thin provisioning volume 411. It means that the continuation of the storage promotion leads to exhaustion of the overall capacity of the thin provisioning volume 411 by the host computer 120. Hence, the administrator determines that the promotion should be continued after the maximum capacity of the thin provisioning volume 411 is expanded.

Figure 12:
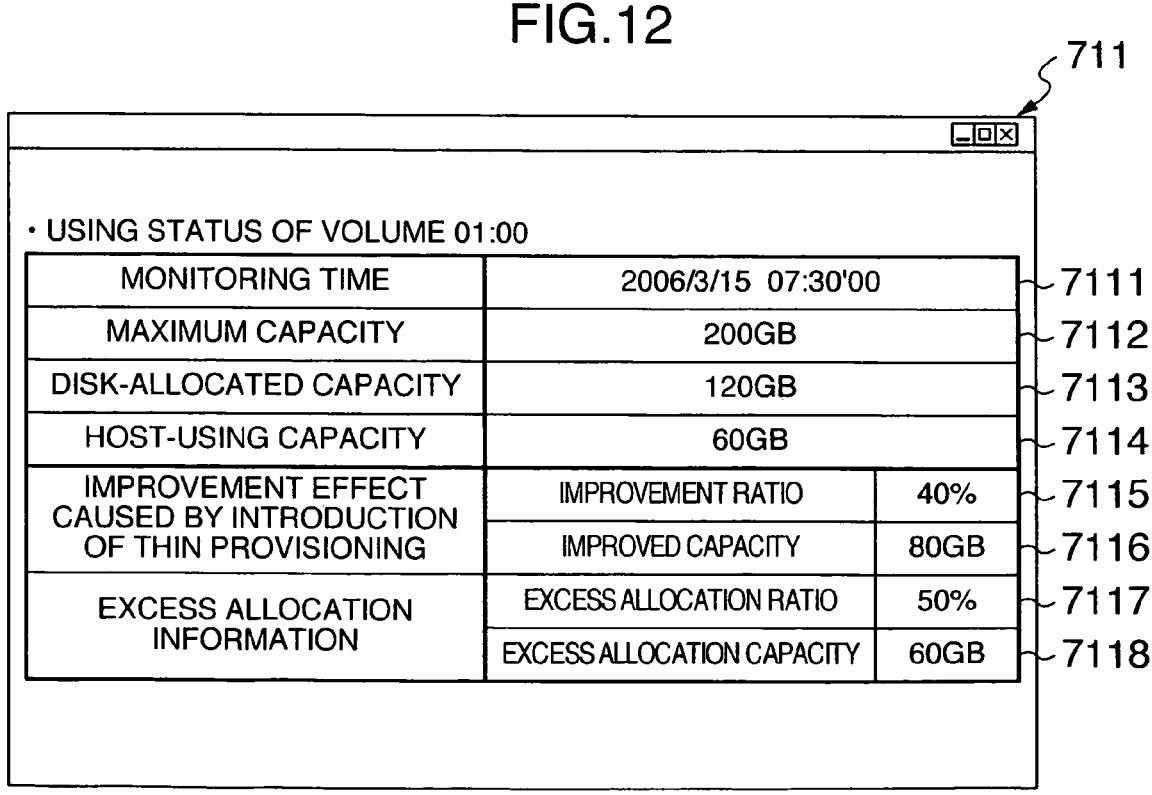
FIG. 12 is an explanatory diagram showing a capacity output view generated by the view display information generating module according to the embodiment of the present invention.

Next, description will be oriented to the case in which the capacity display view 711 shown in FIG. 12 is displayed.

FIG. 12 is an explanatory diagram showing the capacity output view 711 generated by the view information generating module 242 according to the embodiment of the present invention.

The capacity output view 711 shown in FIG. 12 includes the monitoring time 7111, the maximum capacity 7112, the disk-allocated capacity 7113, the host-using capacity 7114, the improvement ratio 7115, the improved allocation 7116, the excess allocation ratio 7117, and the excess allocation capacity 7118. Those are the same as those included on the capacity output view described with reference to FIG. 9. Hence, the description thereabout is left out.

On the capacity display view 711 shown in FIG. 12, the improvement ratio 7115 is 40%. That is, since the improvement ratio 7115 is 20% or more, this ratio meets the hope of the administrator. Further, on the capacity display view 711 shown in FIG. 11, the excess allocation ratio 7117 is 50%. That is, since the excess allocation ratio 7117 is more than 30%, this ratio does not meet the hope of the administrator.

As described above, on the capacity display view 711 shown in FIG. 11, only the improvement ratio 7115 meets the hope of the administrator. In this case, the administrator does not determine if the storage promotion of the thin provisioning volume 411 is to be continued promptly. Hence, by referring to the frequency of writing data to the thin provisioning volume 411 or deleting data therefrom, the administrator determines if the promotion of the thin provisioning volume 411 is to be continued. That is, the administrator determines if the storage promotion of the thin provisioning volume 411 is to be continued by periodically referring to the capacity display view 711.

In addition, the capacity monitoring server 130 may cause the operating terminal 140 to display the performance display view in combination with the capacity output view 711.

Figure 13:
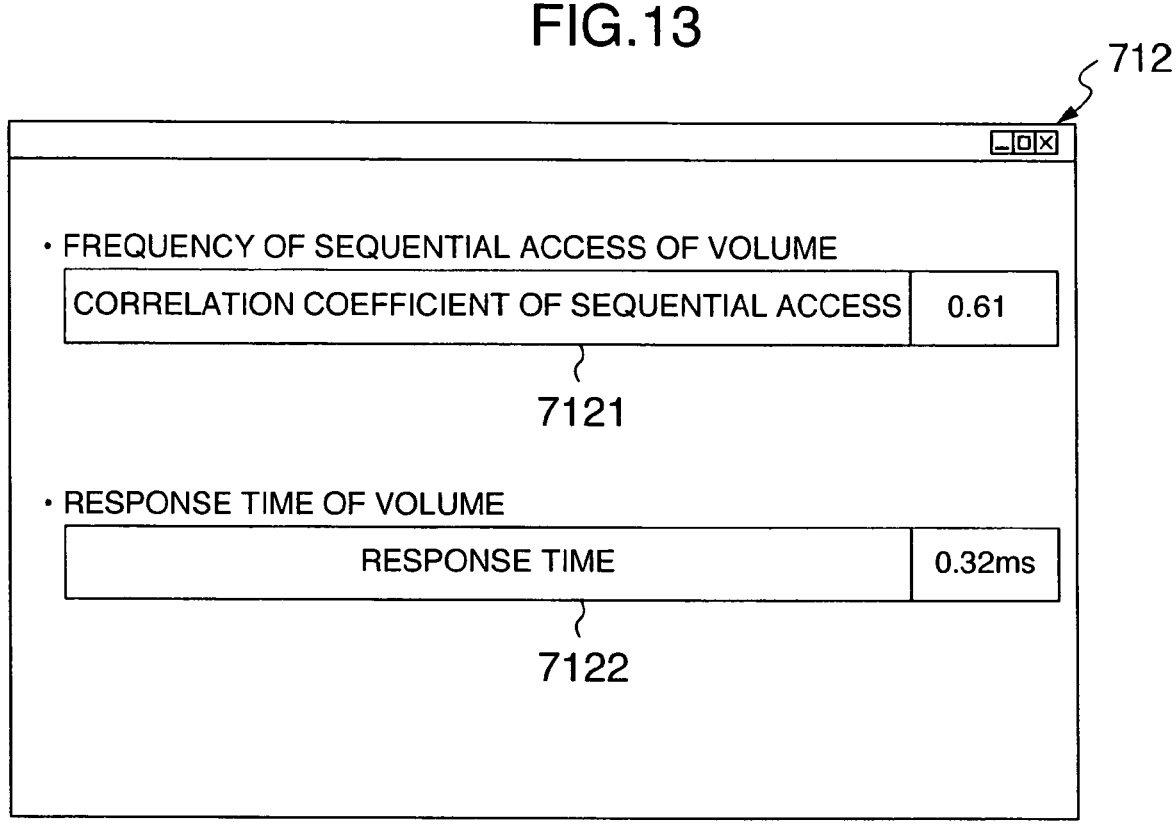
FIG. 13 is an explanatory diagram showing a capacity output view generated by the view display information generating module according to the embodiment of the present invention.

FIG. 13 is an explanatory diagram showing the performance display view 712 generated by the view information generating module 242 according to the embodiment of the present invention.

The performance display view 712 includes the correlation function 7121 and the response time 7122 of the sequential access.

The correlation function 7121 of the sequential access indicates a frequency of a sequential access against the thin provisioning volume 411.

The capacity monitoring server 130 derives the correlation function R of the sequential access from the following operation.

At first, the sequential access frequency calculating module 212 of the capacity monitoring server 130 receives from the storage subsystem 110 the array in which the addresses of the accessed blocks are ranged in sequence. The module 212 calculates the correlation function R of the sequential access based on the received array. Concretely, the module calculates the correlation function R of the sequential access through the following expressions (5), (6) and (7):

$$R = \frac{\sum_{i=1}^{n}(x_i - \overline{x})(y_i - \overline{y})}{\sqrt{\sum_{i=1}^{n}(x_i - \overline{x})^2 \times \sum(y_i - \overline{y})^2}} \quad (5)$$

$$\overline{x} = \frac{1}{n}\sum_{i=1}^{n} x_i \quad (6)$$

$$\overline{y} = \frac{1}{n}\sum_{i=1}^{n} y_i \quad (7)$$

where xi is an address of the i-th accessed block, yi is an address of the (i+1)th accessed block, and n is a number of addresses obtained from the storage subsystem 110 by the sequential access frequency calculating module 212.

Then, the view information generating module 242 of the capacity monitoring server 130 displays the correlation function R calculated by the module 212 as the correlation function 7121 of the sequential access appearing on the performance display view 712.

As the absolute value of the correlation function 7121 of the sequential access comes closer to zero, the frequency of the sequential access to the thin provisioning volume 411 is made lower. Hence, the administrator does not need to try to shift from the thin provisioning volume 411 to the LU.

On the other hand, as the absolute value of the correlation function 7121 of the sequential access comes closer to 1, the frequency of the sequential access to the thin provisioning volume 411 is made higher. Hence, the administrator needs to try to shift from the thin provisioning volume 411 to the LU.

This is because the thin provisioning volume 411 is disadvantageous in the performance of the sequential access. The thin provisioning volume 411 is inferior to the LU in the performance of the sequential access, because the sequential addresses in the thin provisioning volume 411 are not necessarily matched to those of the physical disk 412. Hence, the sequential access to the thin provisioning volume 411 may be a random access to the physical disk 412. In general, the sequential access is processed at faster speed than the random access. Therefore, as the frequency of the sequential access is made higher, the thin provisioning volume 411 is more inferior to the LU in the access performance.

As such, the administrator determines if the absolute value of the correlation function 7121 of the sequential access is more than or equal to the predetermined value. In a case that the absolute value thereof is more than or equal to the predetermined value, the administrator needs to try to shift from the thin provisioning volume 411 to the LU.

The response time 7122 is a response time of an access to the thin provisioning volume 411.

The response time monitoring module 213 of the capacity monitoring server 130 obtains from the storage subsystem 110 the response time of an access to the thin provisioning volume 411. Then, the view information generating module 242 of the server 130 displays the response time obtained by the module 213 as the response time 7122 appearing on the performance display view 712.

The administrator determines if the response time 7122 is more than or equal to the predetermined value. If the response time 7122 is less than the predetermined value, the thin provisioning volume 411 meets the access performance hoped by the administrator. Hence, the administrator does not need to try to shift from the thin provisioning volume 411 to the LU.

On the other hand, if the response time is more than or equal to the predetermined value, the thin provisioning volume 411 does not meet the access performance hoped by the administrator. Hence, the administrator needs to try to shift from the thin provisioning volume 411 to the LU.

As described above, by referring to the capacity output view 711 and the performance display view 712, the administrator enables to properly determine if the storage promotion of the thin provisioning volume 411 is to be continued.

In this embodiment, the capacity output view 711 and the performance display view 712 are shown on respective ones. In actual, however, the information included in the capacity output view 711 and the information included in the performance display view 712 may be included on one view.

Figure 14:
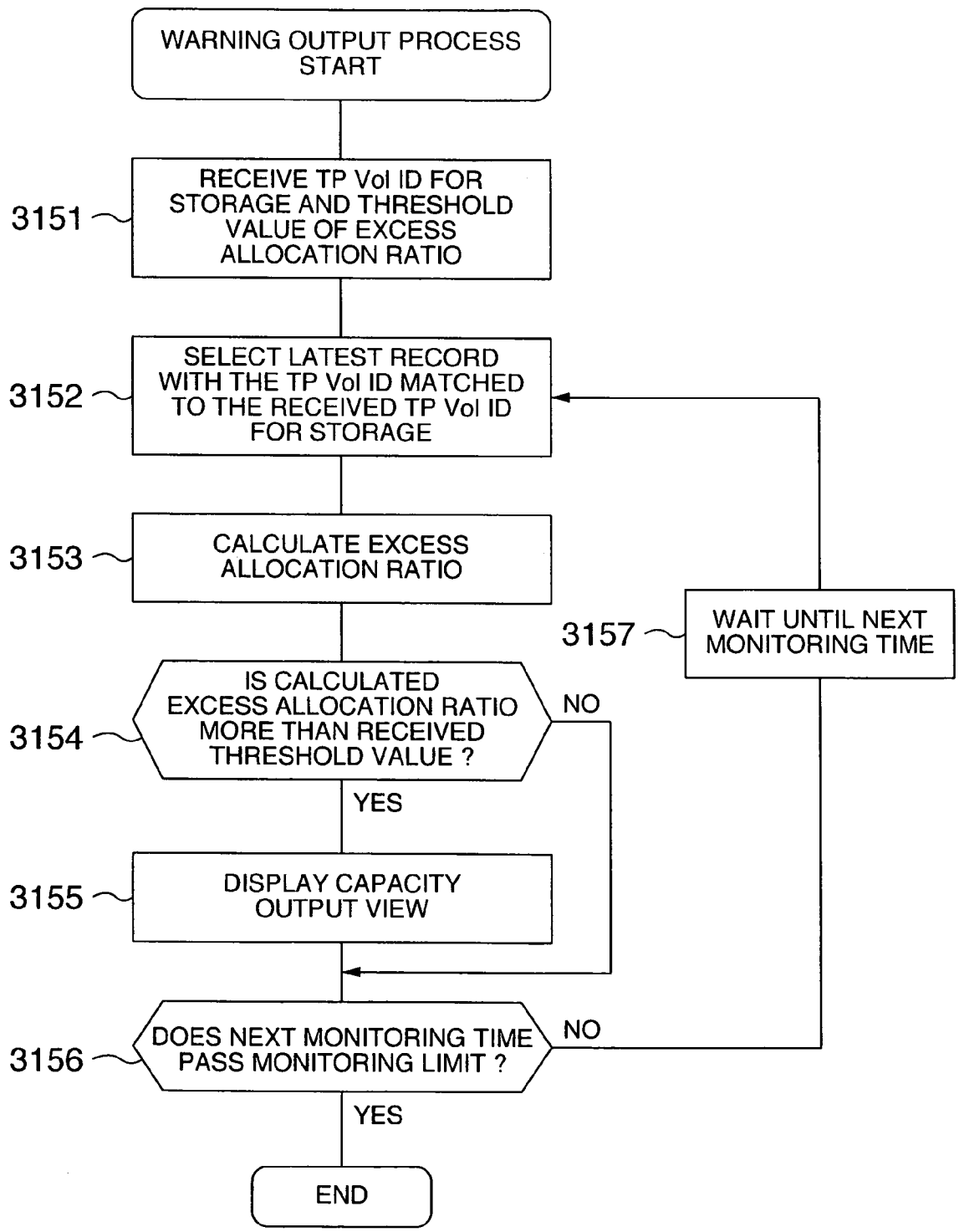
FIG. 14 is a flowchart showing a process of outputting a warning, the process to be executed by the capacity monitoring server according to the embodiment of the present invention.

FIG. 14 is a flowchart showing a process of outputting a warning, the process being executed by the capacity monitoring server 130 according to this embodiment of the invention.

The administrator enters into the operating terminal 140 the TPVol ID for storage of the thin provisioning volume 411 to be warned and the threshold value of the excess allocation ratio. In response, the operating terminal 140 is served to transmit the entered TPVol ID for storage and the threshold value of the excess allocation ratio to the capacity monitoring server 130.

The input module 241 of the server 130 receives from the operating terminal 140 the TPVol ID for storage and the threshold value for the excess allocation ratio (Step 3151).

In response, the warning module 234 of the server 130 selects from the volume capacity recording table 532 all the records in which the TPVol ID for storage received by the input module 241 is matched to the TPVol ID 5321 for storage of the volume capacity recording table 532. Next, the warning module 234 selects the record with the latest monitoring time 5325 from the selected records (Step 3152).

Then, the excess allocation capacity calculating module 214 of the server 130 extracts from the record selected by the warning module 234 the disk-allocated capacity 5322, the host-using capacity 5323, the maximum capacity 5324, and the monitoring time 5325.

Next, the excess allocation capacity calculating module 214 of the server 130 calculates the improvement ratio, the improved capacity, the excess allocation ratio, and the excess allocation capacity based on the extracted disk-allocated capacity 5322, the host-using capacity 5323 and the maximum capacity 5324 (Step 3153). The improvement ratio, the improved capacity, the excess allocation ratio and the excess allocation capacity of the thin provisioning volume 411 are calculated by the same method as the operation of Step 3142 included in the capacity display process (see FIG. 8).

Next, the warning module 234 of the server 130 determines if the excess allocation ratio calculated by the excess allocation capacity calculating module 214 is more than the threshold value of the excess allocation ratio received by the input module 241 (Step 3154).

If the calculated excess allocation ratio is less than or equal to the threshold value of the excess allocation ratio, the warning module 234 does not need to display a warning. Then, the warning module 234 causes the operation to go to Step 3156 without a warning. On the other hand, if the calculated excess allocation ratio is more than the threshold value thereabout, the view information generating module 242 of the server 130 generates the capacity output view (see FIG. 15).

FIG. 15 is an explanatory diagram showing the capacity output view 711 generated by the view information generating module 242 according to the embodiment of the present invention.

The capacity output view 711 includes information about the thin provisioning volume 411 specified as a warning target by the administrator. Concretely, the capacity output view 711 includes the monitoring time 7111, the maximum capacity 7112, the disk-allocated capacity 7113, the host-using capacity 7114, the improvement ratio 7115, the improved capacity 7116, the excess allocation ratio 7117, the excess allocation capacity 7118 and a warning message 7119.

The monitoring time 7111, the maximum capacity 7112, the disk-allocated capacity 7113, the host-using capacity 7114, the improvement ratio 7115, the improved capacity 7116, the excess allocation ratio 7117 and the excess allocation capacity 7118 are the same as those included in the capacity output view described with reference to FIG. 9. Hence, the description thereabout is left out.

The warning message 7119 states as a warning the fact that the excess allocation ratio of the thin provisioning volume 411 identified by the entered TPVol ID for storage exceeds the entered threshold value.

Turning back to FIG. 14, the view information generating module 242 generates the capacity output view 711 having the warning message 7119 based on the received target record and the value calculated by the excess allocation capacity calculating module 214.

Then, the information display module 243 of the capacity monitoring server 130 transmits to the operating terminal 140 the capacity output view 711 generated by the view information generating module 242. In response, the operating terminal 140 is served to display the received capacity output view 711 (Step 3155).

Next, the capacity monitoring module 231 of the server 130 selects a record in which the TPVol ID for storage received by the input module 241 is matched to the TPVol ID 5311 for storage of a table 531 of a list of hosts using the volumes to be monitored from the list table 531.

Next, the capacity monitoring module 231 extracts the monitoring interval 5314 and the monitoring limit 5315 from the selected record. Then, the capacity monitoring module 231 adds the extracted monitoring interval 5314 to the extracted monitoring time 5325 for calculating the next monitoring time. Then, the capacity monitoring server 130 determines if the next calculated monitoring time passes the extracted monitoring time limit 5315 (Step 3156).

If the next monitoring time does not pass the monitoring limit 5315, the capacity monitoring module 231 is waiting until the next calculated monitoring time (Step 3157). Afterwards, the capacity monitoring module 231 causes the operation to go back to Step 3152. Then, the capacity monitoring module 231 repeats the process of outputting a warning to the thin provisioning volume 411.

On the other hand, if the next monitoring time passes the monitoring limit 5315, the capacity monitoring module 231 does not need to monitor the thin provisioning volume 411 again. Hence, the capacity monitoring server 130 terminates the process of outputting a warning.

As described above, the capacity monitoring server 130 enables to automatically notify the administrator of the rise of the excess allocation ratio by executing the warning output process. This allows the administrator to lessen the burden of monitoring the capacity of the thin provisioning volume 411.

The capacity monitoring server 130 may cause the operating terminal 140 to display the performance display view 712 (see FIG. 16) having the warning message.

Further, the capacity monitoring server 130 may output the warning about the improvement ratio by the same method. In this case, instead of the threshold value of the excess allocation ratio, the administrator enters the threshold value of the improvement ratio. Then, the server 130 determines whether or not the calculated improvement ratio is less than the entered threshold value of the improvement ratio. If the calculated excess allocation ratio is less than the threshold value of the excess allocation ratio, the server 130 generates and displays the capacity output view having the warning message.

As described above, the server 130 may automatically notify the administrator of the lower improvement ratio. This allows the administrator to lessen the burden of monitoring the capacity of the thin provisioning volume 411.

FIG. 16 is an explanatory diagram showing the performance display view 712 generated by the view information generating module 242 according to the embodiment of the present invention.

The performance display view 712 includes the correlation function 7121 of the sequential access, the response time 7122 and the warning message 7123. The correlation function 7121 of the sequential access and the response time 7122 are the same as those included on the performance display view (see FIG. 13). Hence, the description thereabout is left out.

The warning message 7123 states as a warning the fact that the response time to the concerned thin provisioning volume 4111 exceeds the threshold value.

The server 130 causes the operating terminal 140 to display the warning message 7123 and the performance display view 712 by the same process as the warning output process (see FIG. 14).

At first, the administrator enters the threshold value of the correlation function of the sequential access and the threshold value of the response time onto the operating terminal 140.

The warning module 234 of the server 130 determines whether or not the absolute value of the correlation function of the sequential access calculated by the sequential access frequency calculating module 212 is more than or equal to the threshold value entered by the administrator. If the absolute value thereof is more than or equal to the threshold value, the view information generating module 242 of the server 130 generates the performance display view 712 having the warning message 7123. Then, the module 242 causes the operating terminal 140 to display the generated performance display view 712.

Likewise, the warning module 234 of the server 130 determines whether or not the response time obtained by the response time monitoring module 213 is more than or equal to the threshold value entered by the administrator. If the obtained response time is more than or equal to the threshold value, the view information generating module 242 of the server 130 generates the performance display view 712 having the warning message 7123. Then, the view information generating module 242 causes the operating terminal 140 to display the generated performance display view 712.

As described above, when the thin provisioning volume 411 does not meet the performance hoped by the administrator, the capacity monitoring server 130 causes the operating terminal 140 to display the performance display view 712 having the warning message. This allows the administrator to lessen the burden of monitoring the performance of the thin provisioning volume 411.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A management method for a computer system comprising at least one host computer, at least one storage system coupling with said host computer, and a management computer coupling with the host computer and the storage system,
wherein said storage system comprises a physical disk for storing data sent from the host computer and a disk controller for controlling input or output of the data to or from the physical disk;
wherein the disk controller provides the host computer with a thin provisioning volume to which a storage area of the physical disk is to be allocated in response to a write request sent from said host computer;
wherein said host computer recognizes the thin provisioning volume as a volume having a capacity bigger than a capacity of the storage area of the physical disk allocated to the thin provisioning volume, said management method comprising:
obtaining from the disk controller a first capacity of the storage area of the physical disk allocated to the thin provisioning volume by using a first volume identifier, the first volume identifier to be used to identify the thin provisioning volume by said storage system,
obtaining from the host computer a second capacity of the storage area of the physical disk used by the host computer by using a second volume identifier, the second volume identifier being used to identify the thin provisioning volume by the host computer,
calculating an excess allocation capacity allocated to the thin provisioning volume by subtracting the second capacity from the first capacity,
calculating an excess allocation ratio by dividing the calculated excess allocation capacity by the first capacity, and
displaying the calculated excess allocation ratio.

2. The management method according to claim 1, further comprising displaying a warning if the calculated excess allocation ratio is greater than a threshold value of the excess allocation ratio.

3. The management method according to claim 1, further comprising:
obtaining a third capacity of the thin provisioning volume recognized by the host computer,
calculating an improved capacity by subtracting the first capacity from the third capacity,
calculating an improvement ratio by dividing the calculated improved capacity by the third capacity, and
displaying the calculated improvements ratio.

4. The management method according to claim 1, further comprising displaying a warning if the calculated improvement ratio is smaller than a threshold value of the improvement ratio.

5. The management method according to claim 1, further comprising:
obtaining from the disk controller a response time of an access to the thin provisioning volume and a record of accesses to said thin provisioning volume,
calculating a frequency of a sequential access to the thin provisioning volume based on the obtained record of accesses to the thin provisioning volume, and
displaying the obtained response time of an access to the thin provisioning volume and the calculated frequency of a sequential access to the thin provisioning volume.

6. The management method according to in claim 5, further comprising:
displaying a warning if the obtained response time of an access to the thin provisioning volume is greater than a threshold value of the response time, and
displaying a warning if the calculated frequency of a sequential access to the thin provisioning volume is greater than a threshold value of the frequency.

7. The management method according to claim 5, wherein the frequency R of a sequential access to the thin provisioning volume is calculated upon following equations:

$$R = \frac{\sum_{i=1}^{n}(x_i - \bar{x})(y_i - \bar{y})}{\sqrt{\sum_{i=1}^{n}(x_i - \bar{x})^2 \times \sum(y_i - \bar{y})^2}}$$

$$\bar{x} = \frac{1}{n}\sum_{i=1}^{n}x_i$$

$$\bar{y} = \frac{1}{n}\sum_{i=1}^{n}y_i$$

where xi is an address of an i-th accessed block, yi is an address of an (i+1)th accessed block, and n is a number of addresses obtained from the storage system.

8. A management computer coupled to a computer system comprising at least one host computer and at least one storage system coupling with said host computer, said storage system including a physical disk for storing data sent from the host computer and a disk controller for controlling input or output of the data to or from the physical disk, the disk controller providing the host computer with a thin provisioning volume to which a storage area of the physical disk is to be allocated in response to a write request sent from said host computer, said host computer recognizing the thin provisioning volume as a volume having a capacity bigger than a capacity of the storage area of the physical disk allocated to the thin provisioning volume, the manager computer comprising a processor, wherein the processor obtains from the disk controller a first capacity of the storage area of the physical disk allocated to the thin provisioning volume by using a first volume identifier, the first volume identifier to be used to identify the thin provisioning volume by said storage system, obtains from the host computer a second capacity of the storage area of the physical disk used by the host computer by using a second volume identifier, the second volume identifier being used to identify the thin provisioning volume by the host computer, calculates an excess allocation capacity allocated to the thin provisioning volume by subtracting the second capacity from the first capacity, calculates an excess allocation ratio by dividing the calculated excess allocation capacity by the first capacity, and displays the calculated excess allocation ratio.

9. The management computer according to claim 8, wherein the processor displays a warning if the calculated excess allocation ratio is greater than a threshold value of the excess allocation ratio.

10. The management computer according to claim 8, wherein the processor obtains from said disk controller a response time of an access to the thin provisioning volume and a record of accesses to the thin provisioning volume, calculates a frequency of a sequential access to the thin provisioning volume based on the obtained record of accesses to the thin provisioning volume, and displays the obtained response time of accesses to the thin provisioning volume and the calculated frequency of a sequential access to the thin provisioning volume.

11. The management computer according to claim 8, wherein the processor obtains a third capacity of the thin provisioning volume recognized by the host computer, calculates an improved capacity by subtracting the first capacity from the third capacity, calculates an improvement ratio by dividing the calculated improved capacity by the third capacity, and displays the calculated improvements ratio.

12. The management computer according to claim 8, wherein the processor displays a warning if the calculated improvement ratio is smaller than a threshold value of the improvement ratio.

13. The management computer according to claim 10, wherein the processor displays a warning if the obtained response time of accesses to the thin provisioning volume is greater than a threshold value of the response time, and displays a warning if the calculated frequency of a sequential access to the thin provisioning volume is greater than a threshold value of the frequency.

14. The management computer according to claim 10, wherein the frequency R of a sequential access to the thin provisioning volume is calculated upon following equations:

$$R = \frac{\sum_{i=1}^{n}(x_i - \bar{x})(y_i - \bar{y})}{\sqrt{\sum_{i=1}^{n}(x_i - \bar{x})^2 \times \sum(y_i - \bar{y})^2}}$$

$$\bar{x} = \frac{1}{n}\sum_{i=1}^{n} x_i$$

$$\bar{y} = \frac{1}{n}\sum_{i=1}^{n} y_i$$

where xi is an address of an i-th accessed block, yi is an address of an (i+1)th accessed block, and n is a number of addresses obtained from the storage system.

* * * * *